US012574783B2

(12) United States Patent (10) Patent No.: US 12,574,783 B2
Micheli et al. (45) Date of Patent: Mar. 10, 2026

(54) METHOD FOR CHARACTERIZATION OF PATHS TRAVELLED BY MOBILE USER TERMINALS

(71) Applicant: Telecom Italia S.p.A., Milan (IT)

(72) Inventors: Davide Micheli, Rome (IT); Aldo Vannelli, Rome (IT)

(73) Assignee: TELECOM ITALIA S.P.A., Milan (IT)

( * ) Notice: Subject to any disclaimer, the term of this patent is extended or adjusted under 35 U.S.C. 154(b) by 292 days.

(21) Appl. No.: 18/286,766

(22) PCT Filed: Apr. 5, 2022

(86) PCT No.: PCT/IB2022/053155
§ 371 (c)(1),
(2) Date: Oct. 13, 2023

(87) PCT Pub. No.: WO2022/219457
PCT Pub. Date: Oct. 20, 2022

(65) Prior Publication Data
US 2024/0196251 A1     Jun. 13, 2024

(30) Foreign Application Priority Data
Apr. 14, 2021     (IT) ........................ 102021000009428

(51) Int. Cl.
*H04W 24/10*     (2009.01)
*H04W 64/00*     (2009.01)

(52) U.S. Cl.
CPC ........... *H04W 24/10* (2013.01); *H04W 64/00* (2013.01)

(58) Field of Classification Search
CPC ......... H04W 4/02; H04W 4/20; H04W 24/10; H04W 64/00
See application file for complete search history.

(56) References Cited

U.S. PATENT DOCUMENTS

2012/0115475 A1     5/2012   Miyake et al.

FOREIGN PATENT DOCUMENTS

WO     2013/021832 A1     2/2013

OTHER PUBLICATIONS

Mohammad Forghani, et al., "From cellular positioning data to trajectories: Steps towards a more accurate mobility exploration", Transportation Research Part C, vol. 117, Jun. 27, 2020, XP086212407, 20 pages.

(Continued)

*Primary Examiner* — Sam Bhattacharya
(74) *Attorney, Agent, or Firm* — XSENSUS LLP

(57)     ABSTRACT

Method for characterization of paths travelled by mobile user terminals, comprising: determining a geographical area of interest; detecting the presence of a plurality of mobile user terminals in said geographical area of interest. The method further comprises, for each of said mobile user terminals: receiving over time a plurality of information signals, each information signal including: a geographical position of said mobile user terminal, a time reference associated with said geographical position and at least one of a temporary identifier and a session identifier; based on said information signals, determining a path travelled by said mobile user terminal; calculating one or more indicators associated with said path, said one or more indicators being indicative of morphologic and dynamic features of said path; providing a characterization of said paths, based on said one or more indicators.

15 Claims, 10 Drawing Sheets

(56)        References Cited

OTHER PUBLICATIONS

International Search Report and Written Opinion mailed on Jul. 5, 2022, received for PCT Application PCT/IB2022/053155, filed on Apr. 5, 2022, 14 pages.

"Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320 V16.4.0 Mar. 2021, pp. 1-35.

3GPP, "Telecommunication management; Subscriber and equipment trace; Trace control and configuration management (Release 17)", 3GPP TS 32.422 V17.2.0, Mar. 2021, pp. 1-233.

● Center of Mass

RG Radius of Gyration a) Detected points b) Detected points arranged in a grid c) Counting of points in each cell

METHOD FOR CHARACTERIZATION OF PATHS TRAVELLED BY MOBILE USER TERMINALS

CROSS-REFERENCE TO RELATED APPLICATIONS

The present application is based on PCT filing PCT/IB2022/053155, filed Apr. 5, 2022, which claims priority from Italian Patent Application No. 102021000009428, filed Apr. 14, 2021, the entire contents of each are incorporated herein by reference.

BACKGROUND OF THE INVENTION

Field of the Invention

The present invention refers to a method for characterization of paths travelled by mobile user terminals.

The invention also refers to a method for classification of users behaviors.

Furthermore, the invention refers to a system for characterization of paths travelled by user mobile terminals.

In addition to the above, the invention refers to a system for classification of users behaviors.

Description of the Related Art

Most people today own electronic mobile devices (es. smartphones, tablets, etc.) which allow individuals to receive and take advantage of multiple services.

Mobile device usage also allows service providers to retrieve and collect information, which can be used by the same provides and/or be transferred to third parties for several purposes—e.g. statistical analysis, targeting for marketing campaigns, improvements/changes in telecommunications networks settings, etc.

The Applicant notes that data regarding users mobility are among those which can be detected and employed in multiple fields.

Certain known solutions are based on detection of presence/mobility of users at cell level. This means that the accuracy with which the position of a given device can be determined is limited to the dimensions of a cell. In other terms, the most precise information regarding a determined device location is that it is within a certain cell. Accordingly, for example, it is merely possible to determine that a device has moved from a cell to a neighboring one, but it is not possible to determine which path has been followed for this displacement.

Other known solutions need an authorization from each user in order to track movements of the respective device(s). Information in this case could be more accurate, but the step of requesting and obtaining the user's authorization can be quite bothering and troublesome.

Document "Outdoor location tracking of mobile devices in cellular networks", EURASIP Journal on Wireless Communications and Networking (2019) 2019:115—https://doi.org/10.1186/s13638-019-1459-4, discloses a method referred to as "AMT" (antenna, map, and timing information-based tracking) which estimates the position of mobile devices based on Timing Advance and power level of 3G data signals.

Document US 2013/0178211 A1 discloses a method of MDT continuous measurement and reporting under multiple PLMNs (Public Land Mobile Networks).

In this context, the Applicant has tackled the problem of classifying users based on their displacements, in a precise and accurate way, without violating data privacy and without requesting any authorization in this respect.

The Applicant has perceived that by employing temporary identifiers (e.g. the Temporary Mobile Subscriber Identity, TMSI), already made available by telecommunications protocols, displacements can be tracked, and several types of analysis can be performed from a statistical point of view, fully respecting users data privacy and avoiding, at the same time, any kind of authorizations from users. Moreover, TMSI data could be further anonymized.

In view of the above, in a first aspect the present invention relates to a method for characterization of paths travelled by mobile user terminals.

According to an embodiment of the present invention, the method comprises determining a geographical area of interest.

According to an embodiment of the present invention, the method comprises detecting the presence of a plurality of mobile user terminals in said geographical area of interest.

According to an embodiment of the present invention, the method comprises, for each of said mobile user terminals, receiving over time a plurality of information signals.

According to an embodiment of the present invention, each information signal includes a geographical position of said mobile user terminal.

According to an embodiment of the present invention, each information signal includes a time reference associated with said geographical position.

According to an embodiment of the present invention, each information signal includes and at least one of a temporary identifier and a session identifier.

According to an embodiment of the present invention, the method comprises, based on said information signals, determining a path travelled by said mobile user terminal.

According to an embodiment of the present invention, the method comprises calculating one or more indicators associated with said path.

According to an embodiment of the present invention, said one or more indicators are indicative of morphologic features of said path.

According to an embodiment of the present invention, said one or more indicators are indicative of dynamic features of said path.

According to an embodiment of the present invention, the method comprises providing a characterization of said paths, based on said one or more indicators.

According to an embodiment of the present invention, said temporary identifier is a TMSI, Temporary Mobile Subscriber Identity.

According to an embodiment of the present invention, said information signals are sent from said mobile user terminals according to the Minimization of Drive Test, MDT, technology.

According to an embodiment of the present invention, determining said path comprises identifying, based on said information signals, a plurality of geographical positions of said mobile user terminal.

According to an embodiment of the present invention, determining said path comprises correlating said geographical positions with each other.

According to an embodiment of the present invention, said path comprises different segments.

According to an embodiment of the present invention, each segment is defined by a plurality of geographical positions.

According to an embodiment of the present invention, each geographical position is associated with a respective time reference.

According to an embodiment of the present invention, said geographical positions are ordered based on the respective time references.

According to an embodiment of the present invention, a difference between time references of each couple of consecutive geographical positions is smaller than a preset threshold.

According to an embodiment of the present invention, said path comprises joining portions joining consecutive segments.

According to an embodiment of the present invention, the information signals including geographical positions belonging to the path are associated to the same session identifier.

According to an embodiment of the present invention, the information signals including geographical positions belonging to the path are associated to the same temporary identifier.

According to an embodiment of the present invention, said one or more indicators comprise a dispersion indicator, correlated to a measure of a dispersion of the points forming said path around a center of mass of said path.

According to an embodiment of the present invention, said one or more indicators comprise a morphology indicator, correlated to a comparison between the dispersion indicator and a length of said path.

According to an embodiment of the present invention, said one or more indicators comprise a dynamic indicator, correlated to a ratio between a length of the path or a length of a path's segment and a time needed to travel said path or segment.

According to an embodiment of the present invention, said one or more indicators comprise an interaction indicator for at least one path.

According to an embodiment of the present invention, calculating said interaction indicator comprises dividing said geographical area in multiple subareas.

According to an embodiment of the present invention, calculating said interaction indicator comprises determining, based on said information signals, a density of population, over time, for each of said subareas.

According to an embodiment of the present invention, said density is indicative of the number of mobile user terminals in each of said subareas, in each of a plurality of time intervals.

According to an embodiment of the present invention, calculating said interaction indicator comprises dividing each segment in a plurality of parts.

According to an embodiment of the present invention, each part is defined as portion of segment comprised between two consecutive points.

According to an embodiment of the present invention, calculating said interaction indicator comprises determining, for each part of each segment of said path, a density of population associated to said part.

According to an embodiment of the present invention, calculating said interaction indicator comprises determining, for each part of each segment of said path the speed at which each part of each segments of said path is travelled.

According to an embodiment of the present invention, calculating said interaction indicator comprises determining, for each part of each segment of said path, a length of said part.

According to an embodiment of the present invention, calculating said interaction indicator comprises determining, for each part of each segment of said path, a time needed to travel said part.

According to an embodiment of the present invention, calculating said interaction indicator comprises calculating the interaction indicator for said path based on the density of population associated to each part of each segment included in said path.

According to an embodiment of the present invention, calculating said interaction indicator comprises calculating the interaction indicator for said path based on the length associated to each part of each segment included in said path.

According to an embodiment of the present invention, calculating said interaction indicator comprises calculating the interaction indicator for said path based on the time associated to each part of each segment included in said path.

In a second aspect, the present invention relates to a method for classification of users behaviors.

According to an embodiment, the method comprises said method for characterization of paths travelled by mobile user terminals.

According to an embodiment of the present invention, the method comprises a determination operation.

According to an embodiment of the present invention, in the determination operation, based on said one or more indicators and/or on said characterization, at least one group is determined, to which said mobile user terminal belongs.

According to an embodiment of the present invention, said at least one group is one group of a set of groups of a preset classification.

According to an embodiment of the present invention, each group of said classification is identified by respective mobility features.

According to an embodiment of the present invention, each group of said classification is identified by respective mobility features compared with preset routes.

According to an embodiment of the present invention, each group of said classification is identified by respective mobility features with respect to means of transport.

In a third aspect, the present invention refers to a system for characterization of paths travelled by mobile user terminals.

According to an embodiment of the present invention, the system comprises a collection subsystem.

According to an embodiment of the present invention, the collection subsystem is configured to receive information included in information signals.

According to an embodiment of the present invention, the information included in the information signals are received from a Radio Access Network.

According to an embodiment of the present invention, the information signals are transmitted by user mobile terminals.

According to an embodiment of the present invention, each information signal includes a geographical position of the mobile user terminal.

According to an embodiment of the present invention, each information signal includes a time reference associated with said geographical position.

According to an embodiment of the present invention, each information signal includes at least one of a temporary identifier and a session identifier.

According to an embodiment of the present invention, the system comprises a path reconstruction subsystem.

According to an embodiment of the present invention, the path reconstruction subsystem is configured to calculate a path travelled by the mobile user terminal.

According to an embodiment of the present invention, the path travelled by the mobile user terminal is calculated based on the information included in the information signals.

According to an embodiment of the present invention, the system comprises an indicator calculation subsystem.

According to an embodiment of the present invention, the indicator calculation subsystem is configured to calculate one or more indicators associated with said path.

According to an embodiment of the present invention, said one or more indicators are indicative of morphologic features of the path.

According to an embodiment of the present invention, said one or more indicators are indicative of dynamic features of the path.

According to an embodiment of the present invention, the system comprises a characterization subsystem.

According to an embodiment of the present invention, the characterization subsystem is configured to provide a characterization of the path.

According to an embodiment of the present invention, the characterization is based on the respective indicators.

According to an embodiment of the present invention, the respective indicators are calculated by the indicator calculation subsystem.

In a fourth aspect, the present invention refers to a system for classification of users behaviors.

According to an embodiment of the present invention, the system comprises said system for characterization of paths travelled by mobile user terminals.

According to an embodiment of the present invention, the system comprises a classification subsystem.

According to an embodiment of the present invention, the classification subsystem is configured to perform a determination operation.

According to an embodiment of the present invention, in the determination operation, based on said one or more indicators and/or on said characterization, at least one group is determined, to which said mobile user terminal belongs.

According to an embodiment of the present invention, said at least one group is one group of a set of groups of a preset classification.

BRIEF DESCRIPTION OF THE DRAWINGS

Further features and advantages will appear more clearly from the detailed description of preferred and non-exclusive embodiments of the invention. This description is provided hereinafter with reference to the accompanying illustrative and non-limiting figures, in which.

DESCRIPTION OF EMBODIMENTS OF THE PRESENT INVENTION

Initially, the method according to the present invention preferably envisages a step of determining a geographical area of interest.

The geographical area can have dimensions from a few hundreds of meters to several kilometers, depending on the analysis to be performed.

Within the area of interest, the presence of mobile user terminals is detected.

Such detection is carried out based on signalling between each of said mobile user terminals and the telecommunications network to which the terminals are connected.

For example, the telecommunications network can be a cellular network, employing the 4G technology or the 5G technology. It has to be underlined that the invention can also be applied in other cellular networks.

The network receives from each mobile user terminal, over time, a plurality of information signals.

Each information signal includes a geographical position of the user terminal device. For example, the position can be expressed in terms of GPS coordinates. The geographical position can be obtained through a positioning module (such as a GPS module) included in each mobile user terminal.

Figure 6:
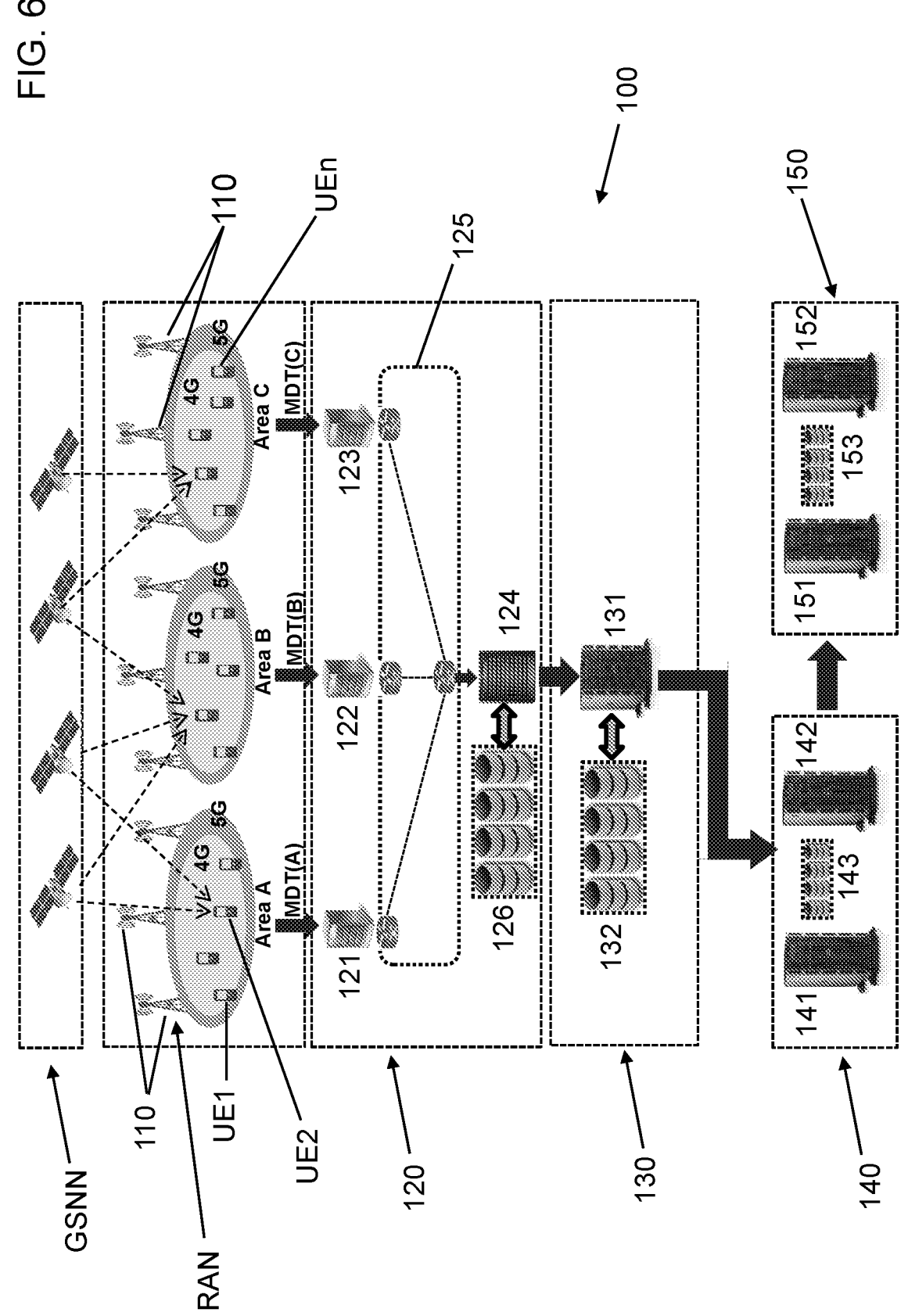
FIGS. 6 and 7 show block diagrams of systems according to the present invention.

It has to be noted that, although specific reference has been made to the GPS system, any suitable position detection system can be used (e.g. Galileo system, GLONASS, etc.); accordingly, a generic GNSS (Global Navigation Satellite System) is schematically represented in FIG. 6.

Each information signal includes a time reference associated with the geographical position. The time reference is also referred to as Timestamp. The time reference indicates the date (preferred format: dd-mm-yyyy, i.e. two digits indicating the day, two digits indicating the month and four digits indicating the year) and time (preferred format: hh:mm:ss.cc, i.e.: two digits indicating the hour, two digits indicating the minutes, two digits indicating the seconds and two digits indicating the hundredths of seconds) on which the geographical position has been detected.

Each information signal includes at least one of a temporary identifier and a session identifier.

The temporary identifier is an identifier that is randomly allocated to a mobile device when it connects to the network. In 4G networks, for example, such temporary identifier is referred to as TMSI—Temporary Mobile Subscriber Identity. The temporary identifier replaces the IMSI (International Mobile Subscriber Identity) in communications with the network, so as to limit the possibility that eavesdroppers detect the IMSI. As known, IMSI uniquely identifies a subscription in a mobile network. IMSI is stored in the SIM module installed in each mobile device. IMSI is initially sent from the mobile device to the network for checking the user's data in the HLR (Home Location Register); IMSI can be locally copied in the VLR (Visitor Location Register). In signalling, IMSI is used as rarely as possible, to protect its privacy. As said, it is replaced by a temporary identifier, such as the TMSI. Association between IMSI and the respective TMSI is stored in the core network. TMSI is allocated at each new connection, out- to in-coverage transition, turn-on of a user terminal or when a change of access network occurs. TMSI remains allocated without being changed as long as the access network remains the same, even in case of handover—until a change of Location Area or Tracking Area occurs.

The session identifier is an identifier of a session (e.g. a call, an SMS exchange, application data exchange, etc.) generated by a determined mobile user device, based on a determined subscription, in a determined time period. Preferably, the time period is defined by the MNO (Mobile Network Operator) according to the legislation in force regarding privacy. During of the session, the device typically sends multiple information signals, each including the same session identifier. The frequency at which the information signals are generated during a session is preferably defined by the MNO. In particular, the MNO determines a reasonable trade-off between accuracy of information (obtained by a large amount of information signals) and traffic overhead (which can be limited by limiting the amount of information signals).

Preferably, each mobile user terminal generates useful information also in Idle mode. Information retrieved/determined in Idle mode are locally stored in a device's buffer, and then transmitted to the network—through information signals—as soon as the device switches to the Connected state.

In a preferred embodiment, the information signals are MDT (Minimization of Drive Test) signals. Such technology is standardized by ETSI and disclosed in technical specification 3GPP TS 37.320; for example, version 15.0.0 (2018-06) can be taken into consideration. Said technical specification is herein incorporated by reference.

For example, each information signal can present the following logical structure:

| Field | Description | Format |
|---|---|---|
| CALL_ID/Session_ID | Session identifier | Positive integer |
| DATE | Date on which the information signal is sent to the eNodeB | YYYY-MM-DD |
| TIME | Time at which the information signal is sent to the eNodeB | hh:mm:ss.sss |
| TIMESTAMP | Date and time at which data are detected | YYYY-MM-DD hh:mm:ss.sss |
| HOME_NETWORK | PLMN of tracing cell | Positive integer |
| MTMSI | MME TMSI, temporary identifier | Positive integer |
| LATITUDE | Latitude (WGS84) | dd.dddddd |
| LONGITUDE | Longitude (WGS84) | ddd.dddddd |
| UNCERT_SEM_MNR | Uncertainty ellipse/ellipsoid semi-minor axis | m |
| UNCERT_SEM_MJR | Uncertainty ellipse/ellipsoid semi-major axis | m |
| ORIENT_MJR_AXIS | Semi-major axis orientation with respect to geographic North | ° |
| ALTITUDE | Height above sea level | m |
| LATITUDE_10 | Central latitude of the pixel in a 10 m x 10 m grid (WGS84) | dd.dddddd |
| LONGITUDE_10 | Central longitude of the pixel in a 10 m x 10 m grid (WGS84) | ddd.dddddd |
| LATITUDE_25 | Central latitude of the pixel in a 25 m x 25 m grid (WGS84) | dd.dddddd |
| LONGITUDE_25 | Central longitude of the pixel in a 25 m x 25 m grid (WGS84) | ddd.dddddd |
| LATITUDE_50 | Central latitude of the pixel in a 50 m x 50 m grid (WGS84) | dd.dddddd |

-continued

| Field | Description | Format |
|---|---|---|
| LONGITUDE_50 | Central longitude of the pixel in a 50 m x 50 m grid (WGS84) | ddd.dddddd |
| CARRIER_FREQ_PCELL | E-UTRA Absolute Radio Frequency Channel Number (downlink) of serving cell | Positive integer |
| CELLID_PCELL | EUTRA Cell ID of the serving cell | Positive integer |
| TIMING ADVANCE | | Positive integer |

The method comprises determining, based on the information signals sent from each mobile user terminal, a path travelled by said mobile user device.

Preferably, this step comprises a preliminary correlation operation: the Applicant observes that the temporary identifier (e.g. the TMSI) and the session identifier are not always both included in each information signal; in particular, the same temporary identifier (e.g. TMSI) is used for a longer time than a session identifier, but is transmitted only at the beginning of a connection, whereas the session identifier is updated (i.e. changed) at each user session. Accordingly, an operation is performed so that information signals are correlated to each other, based on the temporary identifier and/or session identifier included therein. In this way, sequences of correlated data (e.g. MDT samples) can be created.

Based on the information signals, sequences of data can be created; such sequences include geographical positions of each mobile user terminal, tracked over time. From a practical point of view, geographical positions are ordered according to the reference time associated thereto; by joining (e.g. by means of a simple linear interpolation) the ordered geographical position, the path travelled by each mobile user terminal can be determined.

In an embodiment, the path of one or more mobile user terminals comprises different segments. Each segment is defined by a plurality of geographical positions; as said, each geographical position is associated with a respective time reference and the geographical positions are ordered based on the respective time refences; in a segment, the difference between time references of each couple of consecutive geographical positions is smaller than a preset threshold.

Preferably, one or more paths include one or more joining portions which join consecutive segments.

Preferably, each segment is identified by a respective segment identifier.

Preferably, each path is identified by a respective path identifier. The path identifier is correlated with the session identifier, in that all the points belonging to a same path are associated to a same session identifier.

The Applicant observes that, in the present description, the expressions "geographical position" and "point" are used interchangeably, since each geographical position included in an information signal defines a corresponding point on the respective path.

In view of the above, a Dataset including the following data can be defined:

Path identifier (Path_ID): code uniquely identifying one path; as said, it is correlated to the session identifier;

Segment identifier (Segment_ID): code uniquely identifying each of the segments belonging to one path;

Hop: number of points forming a segment; such points are ordered from a first point to a last point; the first point is preferably indicated as Hop=0; the last point is generally referred to as "Hop max";

Timestamp: date and time on which the data are detected;

Latitude: GPS latitude of the position of the mobile user terminal;

Longitude: GPS longitude of the position of the mobile user terminal.

Figure 1:
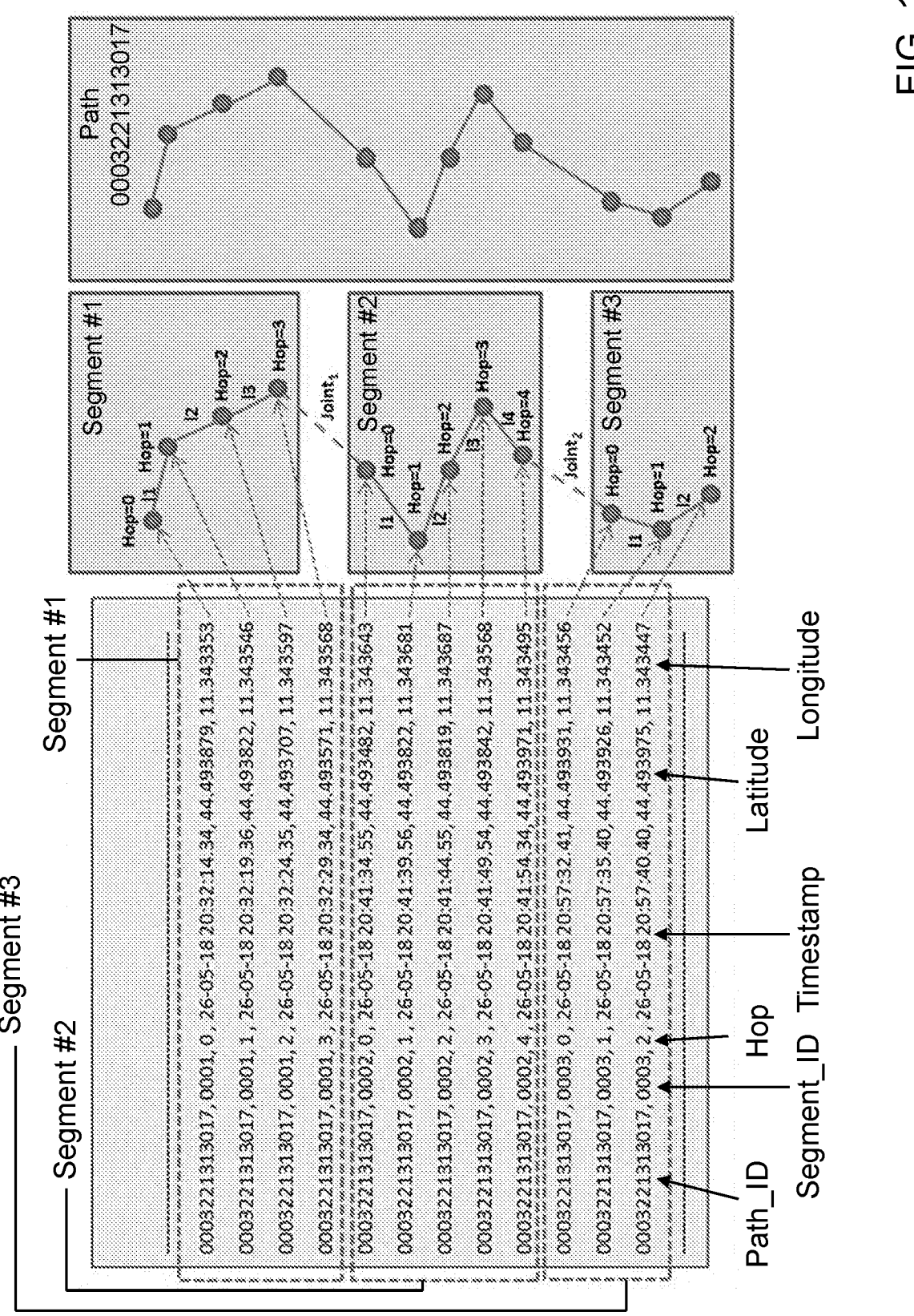
FIG. 1 schematically shows examples of data detected and processed in the method according to the present invention.

FIG. 1 schematically shows a path, with the Dataset associated thereto. It can be appreciated that the exemplary path comprises three segments (Segment #1, Segment #2, Segment #3), and two joining portions (Joint1, Joint2) which join Segment #1 with Segment #2, and Segment #2 with Segment #3, respectively.

Considering now Segment #1, for example, FIG. 1 shows that it is defined by four points (or geographical positions), identified as Hop0 . . . Hop3, respectively. In this case, "Hop max" is equal to 3. The three parts defined by each couple of consecutive points are labelled as I1, I2, I3.

Preferably, the method according to the present invention comprises a step of calculating the length of each of the segments comprised in one path.

The length of a segment can be calculated as follows:

$$L_{Segm} = \sum_{h=1}^{Hop\,max} l_h$$

wherein $l_h$ indicates the distance between the h-th point and the (h−1)-th point.

Preferably, the method according to the present invention comprises a step of calculating the length of each path.

The length of a path can be calculated as follows:

$$L_{Path} = \sum_{i=1}^{P} L_{Segm_i} + \sum_{j=1}^{J} L_{joint_j}$$

wherein P is the number of segments comprised in the path, J is the number of joining portions comprised in the path, $L_{joint_j}$ is the length of the j-th joining portion.

Preferably, the method according to the invention comprises calculating one or more indicators associated each path. The indicators are indicative of morphologic and dynamic features of said path.

Preferably, the morphologic indicator(s) is/are indicative of the shape of the path travelled by the mobile user terminal.

Preferably, the dynamic indicator(s) is/are indicative of a speed at which the path is travelled and/or of variation(s) of a speed at which the same path is travelled.

In an embodiment, the one or more indicators comprise a dispersion indicator; the dispersion indicator is to a measure of a dispersion of the points forming the path around a center of mass of the same path.

An example of a dispersion indicator can be a radius of gyration (RG).

The radius of gyration $RG_i$ of a generic i-th path can be calculated as follows:

$$RG_i = \sqrt{\frac{1}{N_i} \sum_{m=1}^{N_i} \rho_m^2}$$

wherein:

$N_i$ represents the number of points comprised in the i-th path $\rho_m$ represents the distance between the m-th point of the path and the center of mass of the same path.

Since all the points comprised in a path have the same weight, the coordinates $Xcm_i$, $Ycm_i$ of center of mass of the i-th path can be calculated as follows:

$$Xcm_i = \frac{1}{N_i} \sum_{m=1}^{N_i} X_m$$

$$Ycm_i = \frac{1}{N_i} \sum_{m=1}^{N_i} Y_m$$

wherein $X_m$, $Y_m$ represent the coordinates of the generic m-th point belonging to the path.

The Applicant notes that the radius of gyration can also be calculated without calculating the coordinates of the center of mass, based on the following equation:

$$RG_i = \sqrt{\frac{1}{N_i^2} \sum_{m>n}^{N_i} r_{m,n}^2}$$

wherein $r_{m,n}^2$ represents the distance between the m-th point and the n-th point belonging to the path.

The Applicant observes that the radius of gyration depends on the morphology of the path; in particular, given a determined overall length of a path:

The radius of gyration has a larger value, if the shape of the path is closer to a rectilinear shape, and the points defining the path are spread at larger distances from the center of mass;

The radius of gyration has a smaller value, if the shape of the path is closer to a circular shape, and the points defining the path are more closely arranged around the center of mass.

For example, a perfectly rectilinear path, in which each point is equally spaced from the previous/subsequent point, the radius of gyration has a value that ranges between a maximum value of $$RG = 0.5 * L_{Path}$$

for a path comprising only two points, and a minimum value of $$RG = \frac{L_{Path}}{2\sqrt{3}} \approx 0.289 * L_{Path}$$

for a path including an asymptotically infinite number of points.

In case the points comprised in the path are equally spaced along a circumference centered in the center of mass, the radius of gyration is calculated as follows:

$$RG = \frac{L_{Path}}{2\pi} \approx 0.159 * L_{Path}$$

Figure 2:
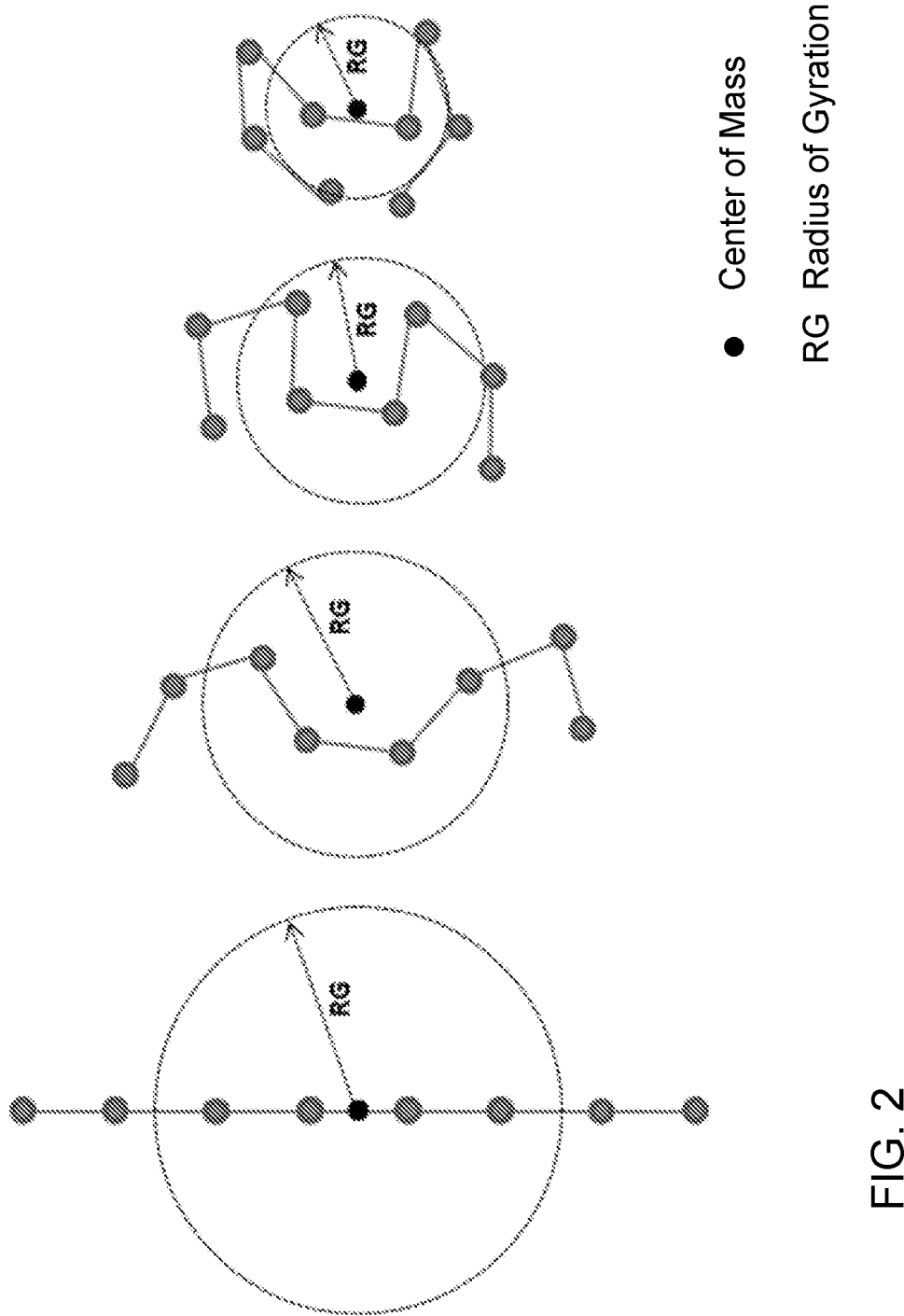
FIG. 2 schematically shows examples of a parameter calculated in the method according to the present invention.

FIG. 2 shows examples of different paths, each associated with a pictorial representation of the respective radius of gyration.

In an embodiment, the one or more indicators comprise a morphology indicator (MI); the morphology indicator is correlated to a comparison between the dispersion indicator and a length of said path.

For example, the morphology indicator $MI_i$ of the generic i-th path can be calculated as follows:

with $0 \leq MI_i \leq 0.5$ $$MI_i = \frac{RG_i}{L_{Path_i}}$$

wherein $RG_i$ represents the radius of gyration of the i-th path, and $L_{Path_i}$ represent the length of the i-th path.

In an embodiment, an average morphologic indicator $MI_{av}$ can be calculated for a determined zone, as the average of the morphologic indicators of all the paths identified in said zone. For example, the following equation can be used:

$$MI_{av} = \frac{1}{Num\ Path} \sum_{i=1}^{NumPath} \frac{RG_i}{L_{Path_i}}$$

The average morphology indicator is an aggregated indicator which can be used to provide a characterization of the paths followed in the zone of interest.

In view of the above, the morphology indicator (either referred to a single path or to an average calculated based on multiple paths) can be interpreted as follows, given the same length of path:

the larger the value of MI, the closer the path to a rectilinear shape:

the smaller the value of MI, the closed the path to a circular shape.

In an embodiment, the one or more indicators comprise a dynamic indicator. The dynamic indicator is correlated to a ratio between a length of the path or a length of a path's segment and a time needed to travel said path or segment.

The dynamic indicator can be calculated as follows:

$$V_{Segm_i} = \frac{L_{Segm_i}}{\Delta T_{Segm_i}} \quad \text{for a generic i-th segment}$$

$$V_{Path_i} = \frac{L_{Path_i}}{\Delta T_{Path_i}} \quad \text{for a generic i-th path}$$

wherein $\Delta T_{Segm_i}$ represents the time needed to travel the generic i-th segment (i.e. the difference in time between the point Hop=0 and the point Hop max of such segment) and $\Delta T_{Path_i}$ represent the time needed for travelling the i-th path (i.e. the difference in time between the point Hop=0 of the first segment of the path and the point Hop max of the last segment of the path).

The Applicant notes that the dynamic indicators can be usefully employed, for example, by arranging them on a diagram representing the probability density for the values of the indicator. In more details, in the diagram the values of the dynamic indicator are arranged on the abscissa axis, and the likelihood to detect each single value is represented on the ordinate axis.

Figure 3:
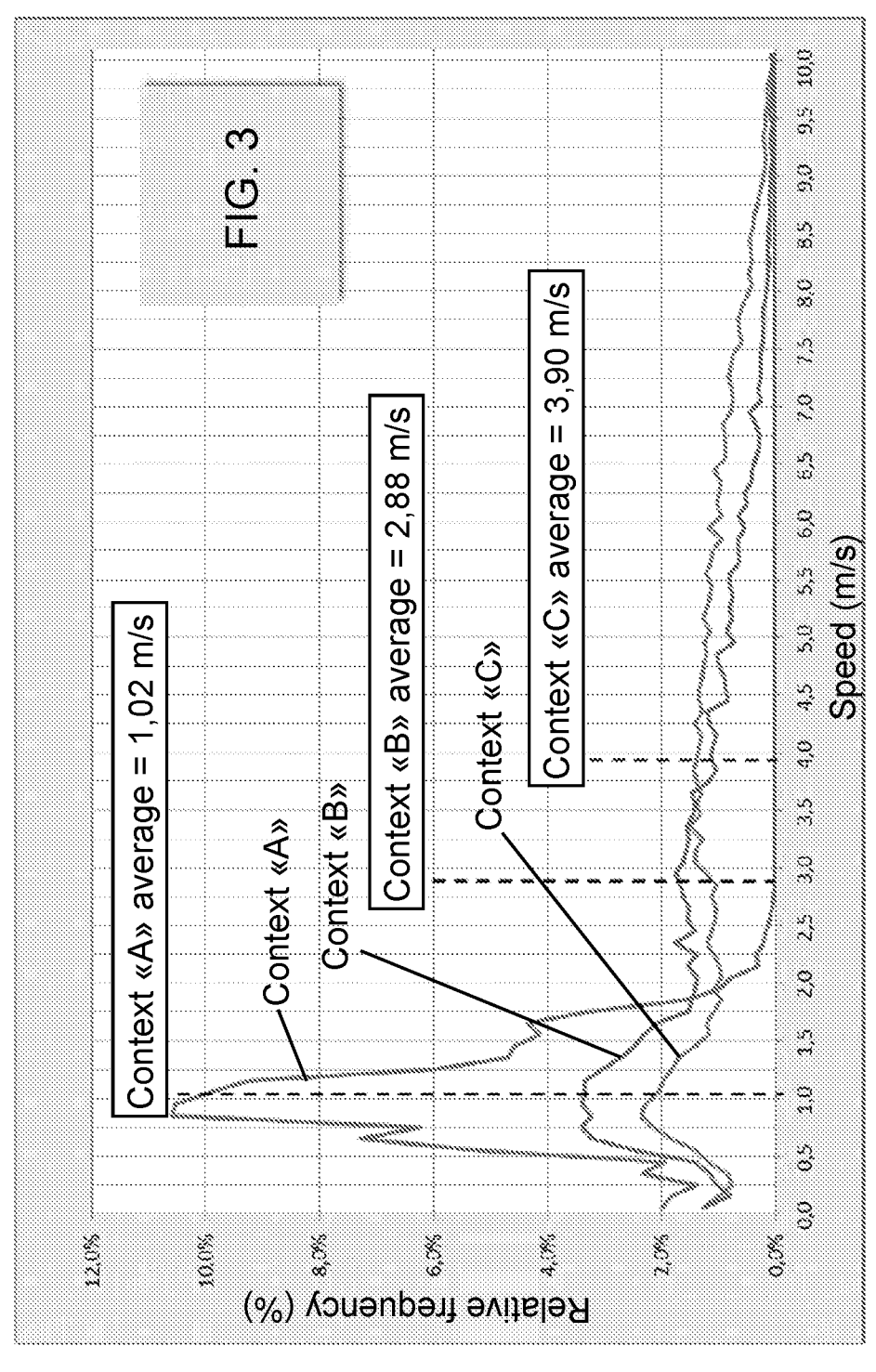
FIGS. 3, 3a-3c schematically show examples of parameters calculated in the method according to the present invention.
Figure 3A:
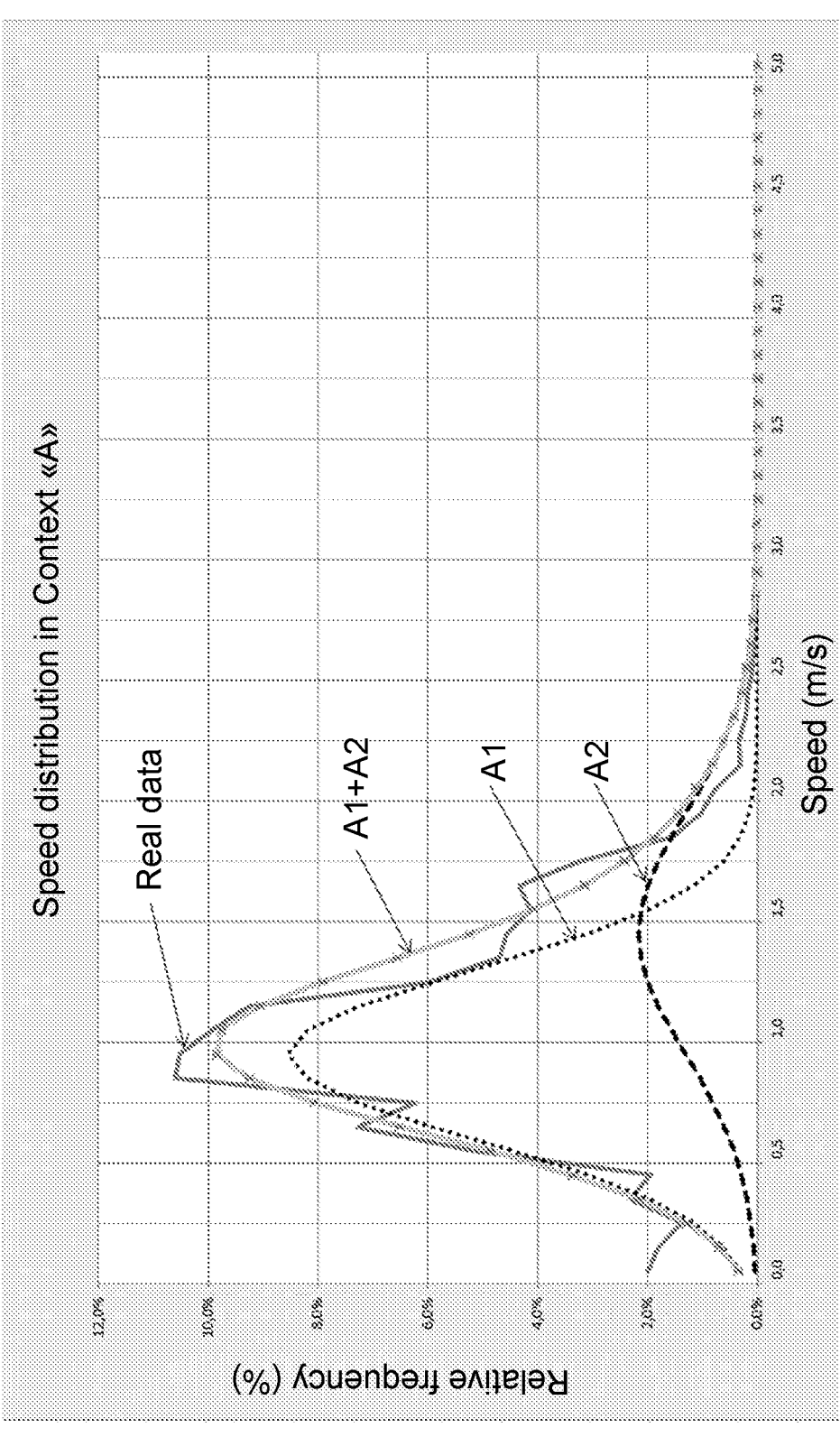

FIG. 3 shows an example of such diagram, wherein three different urban contexts (namely context "A", context "B" and context "C") are represented, along with the respective average speeds.

The velocity distributions obtained as explained above can be broken down into a weighted sum of elementary probability functions (e.g. Normal or Gaussian) by means of the so-called Gaussian Mixture Model, GMM.

Each component of the weighted sum corresponds to a component of the population mobility.

Figure 3B:
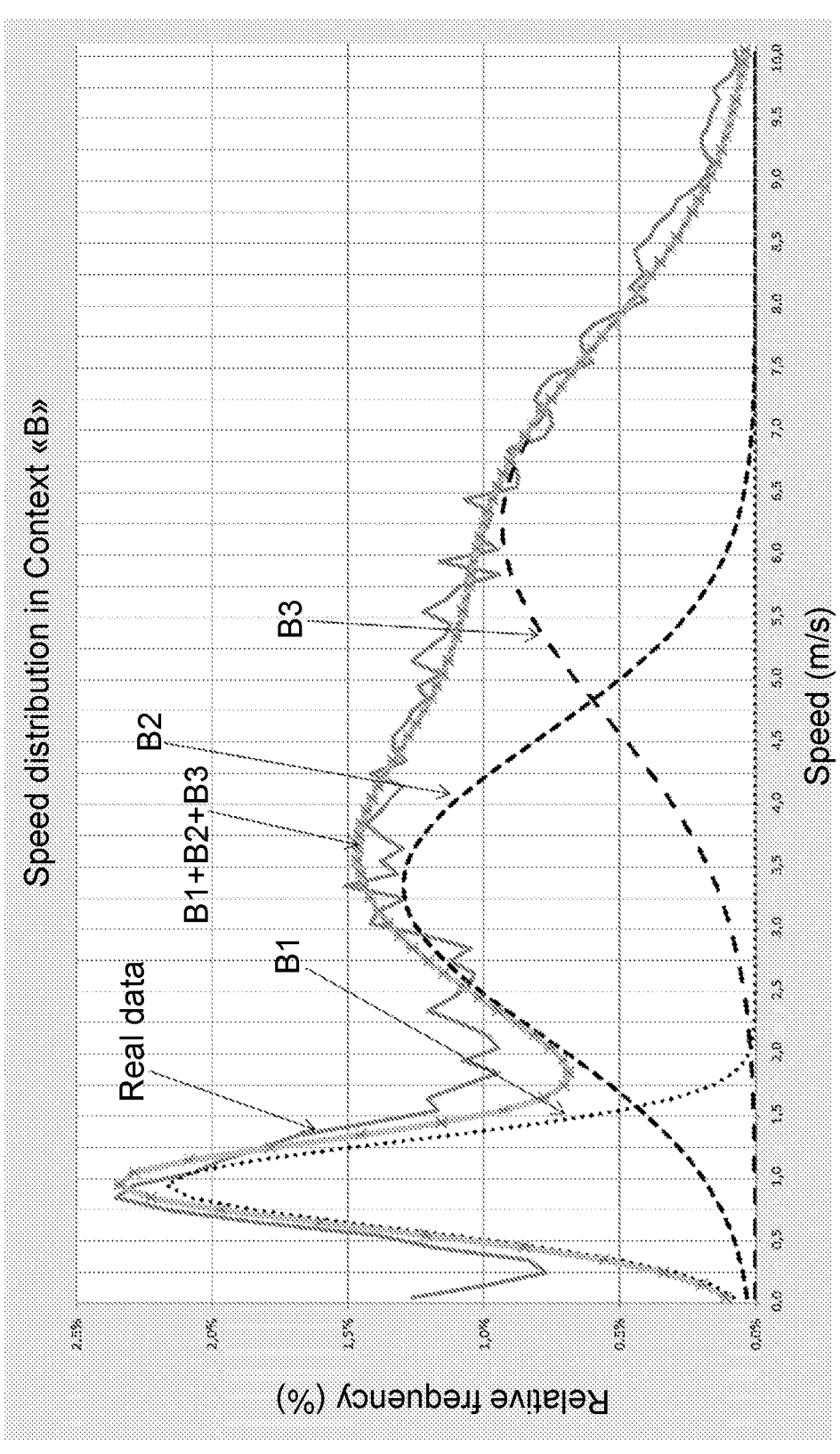

For example, the velocity distribution of urban context "A" is obtained by the combination of components A1, A2; FIG. 3b shows the curves representing the real data, detected through the information signals, normal distribution A1, normal distribution A2 and the sum A1+A2 (which fits with a satisfactory approximation the real data).

The two components A1, A2 are characterized by the following parameters:

| | |
|---|---|
| A1 | $\xi_1 = \{\lambda_1 = 0.735, \mu_1 = 0.89, \sigma_1 = 0.35\}$ |
| A2 | $\xi_2 = \{\lambda_2 = 0.265, \mu_2 = 1.41, \sigma_2 = 0.49\}$ |

From a practical point of view, component A1 represents people travelling on foot, whereas component A2 represent people travelling by boat (it has to be noticed that context "A" corresponds to Venice, wherein traffic by car is substantially null).

For example, the velocity distribution of urban context "B" is obtained by the combination of components B1, B2, B3; FIG. 3b shows the curves representing the real data, detected through the information signals, normal distribution B1, normal distribution B2, normal distribution B3 and the sum B1+B2+B3 (which fits with a satisfactory approximation the real data).

The three components B1, B2, B3 are characterized by the following parameters:

| | |
|---|---|
| B1 | $\xi_1 = \{\lambda_1 = 0.204, \mu_1 = 0.89, \sigma_1 = 0.35\}$ |
| B2 | $\xi_2 = \{\lambda_2 = 0.420, \mu_2 = 3.32, \sigma_2 = 1.20\}$ |
| B3 | $\xi_3 = \{\lambda_3 = 0.376, \mu_3 = 6.25, \sigma_3 = 1.50\}$ |

From a practical point of view, B1 represents people travelling on foot, B2 represents people travelling by motor vehicles in the most central zones of the city (where typically speed limits are lower) and B3 represent people travelling by motor vehicles outside the most central zones of the city (where typically speed limits are higher).

Figure 3C:
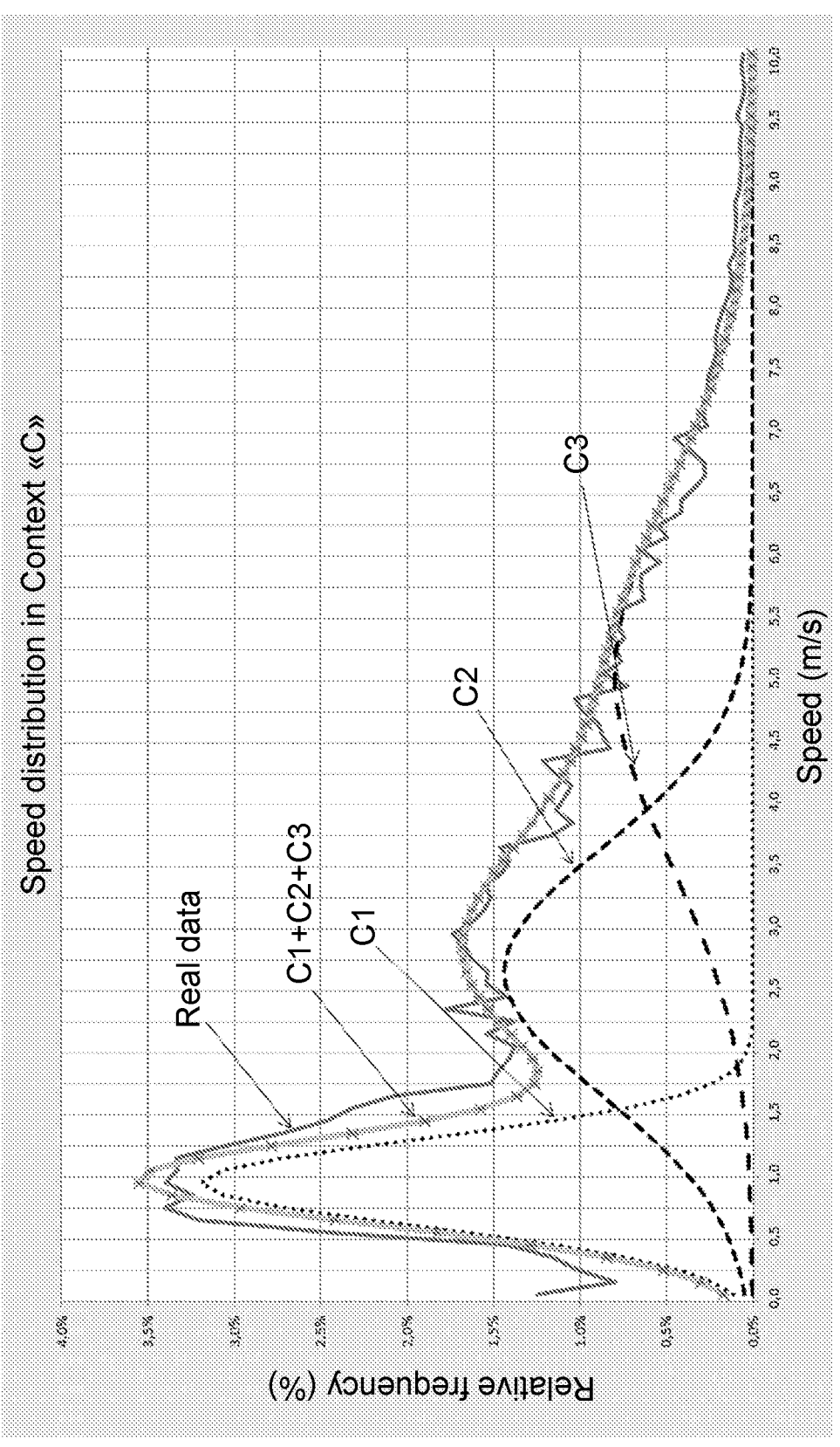

For example, the velocity distribution of urban context "C" is obtained by the combination of components C1, C2, C3; FIG. 3c shows the curves representing the real data, detected through the information signals, normal distribution C1, normal distribution C2, normal distribution C3 and the sum C1+C2+C3 (which fits with a satisfactory approximation the real data).

The three components C1, C2, C3 are characterized by the following parameters:

| | |
|---|---|
| C1 | $\xi_1 = \{\lambda_1 = 0.298, \mu_1 = 0.89, \sigma_1 = 0.35\}$ |
| C2 | $\xi_2 = \{\lambda_2 = 0.383, \mu_2 = 2.61, \sigma_2 = 1.00\}$ |
| C3 | $\xi_3 = \{\lambda_3 = 0.319, \mu_3 = 5.10, \sigma_3 = 1.50\}$ |

From a practical point of view, C1 represents people travelling on foot, C2 represents people travelling by motor vehicles in the most central zones of the city (where typically speed limits are lower) and C3 represent people travelling by motor vehicles outside the most central zones of the city (where typically speed limits are higher).

The Applicant observes that the generic vector $\xi_i$ includes three values $\lambda_i$, $\mu_i$ and $\sigma_i$ which represent the weight to be applied to the respective component, the average and the standard deviation, respectively.

The parameters included in the vector $\xi_i$ are calculated (estimated) in such a way that the sum of the components best approximates the curve defined by the real data (i.e. the data detected through the information signals). For example, the Maximum Likelihood Method can be used; in particular, the Expectation Maximization (EM) iterative algorithm can be employed.

In an embodiment, the one or more indicators comprise an interaction indicator.

Preferably, calculating the interaction indicator comprises the following operations:

dividing the geographical area in multiple subareas;

determining, based on the information signals, the number of mobile user terminals in each of said subareas, in each of a plurality of time intervals;

dividing each segment in a plurality of part; each part is defined as that portion of segment comprised between two consecutive points;

for each part of each segment of said path, determining: a density of population associated to said part, a length of said part, and a time needed to travel said part.

Finally, based on the density of population, length and time associated to each part of each segment included in said path, the interaction indicator for said path is calculated.

Figure 4:
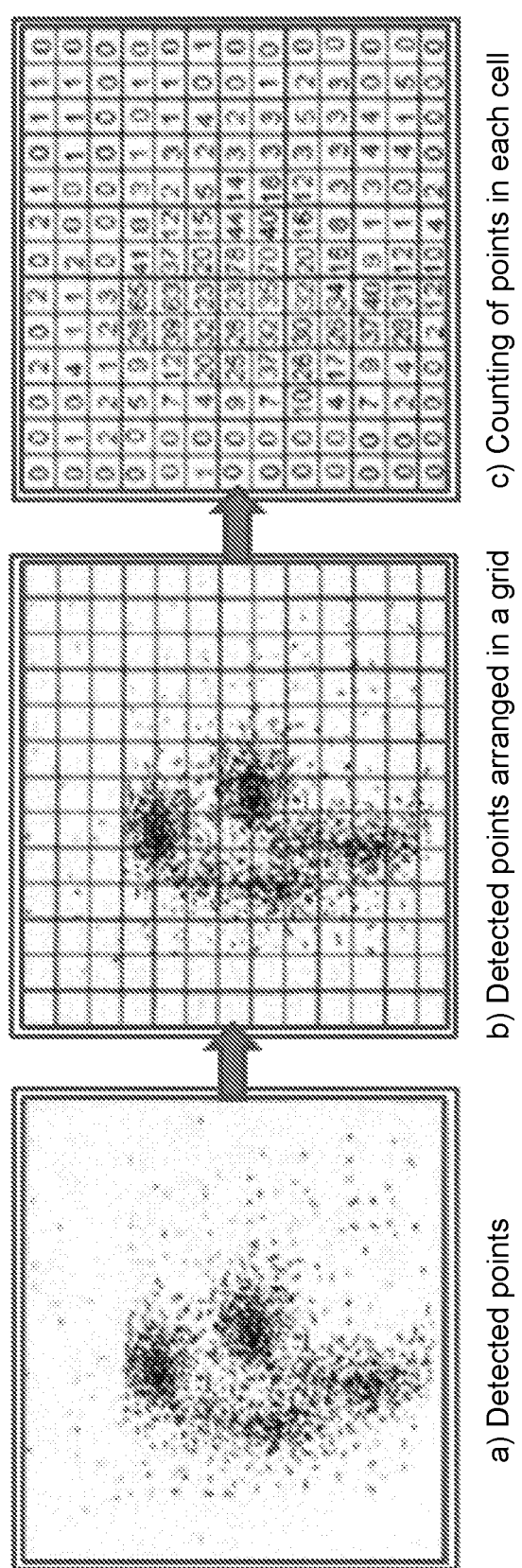
FIGS. 4-5 schematically show examples of processing operations carried out in the method according to the present invention.

FIG. 4 schematically represents how the density of population is determined: step "a" shows the detected points, i.e. the geographical position of each detected mobile user terminal; step "b" shows the detected points arranged in a grid—the grid being used to divide the geographical area in multiple subareas, so that each subarea corresponds to a cell of the grid; step "c" shows the counting of the mobile user terminal in each cell of the grid, i.e. in each subarea.

Figure 5:
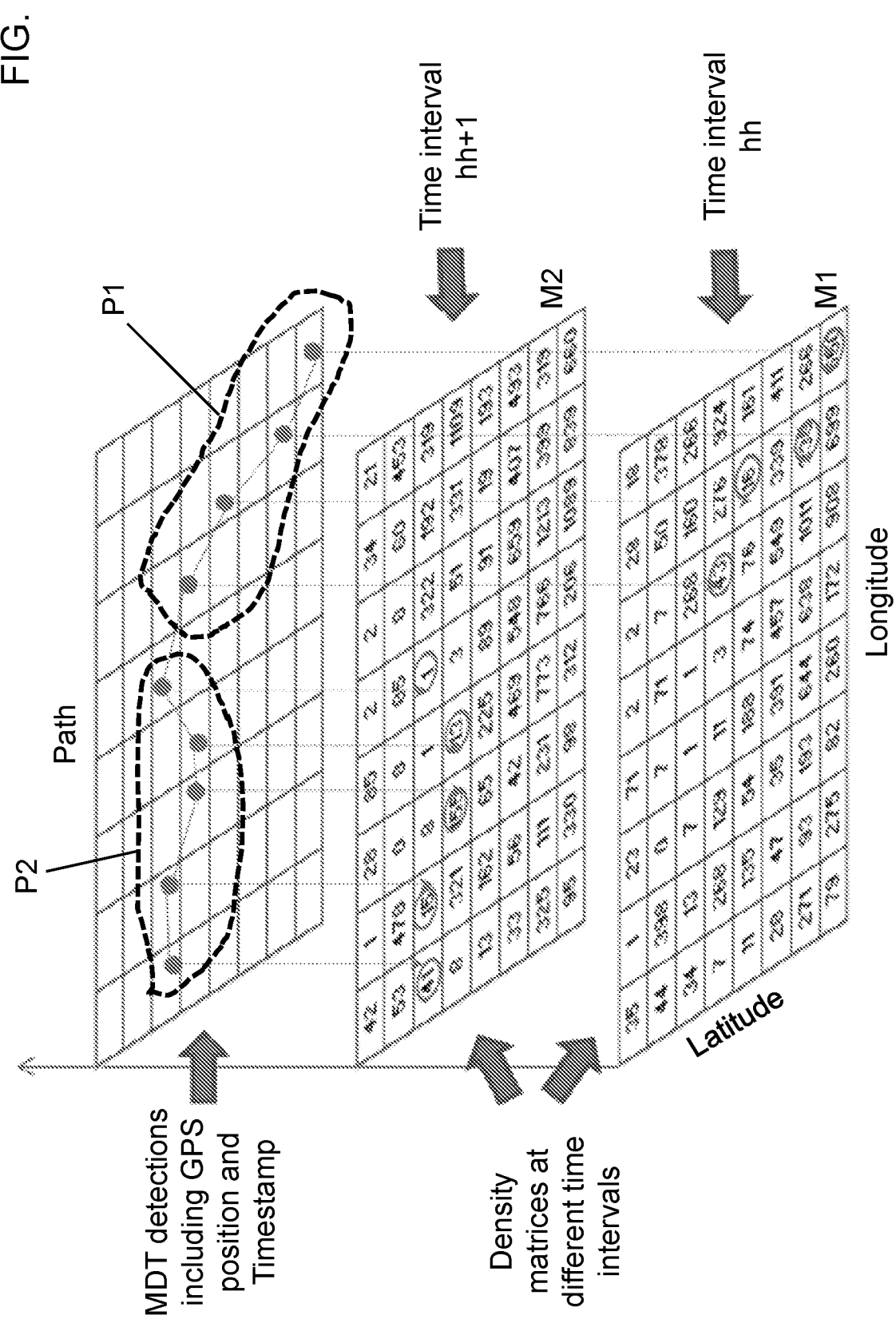

FIG. 5 schematically shows the process of associating, to each point of a path, the respective density. The top layer represents the path and the point belonging to the same; the bottom layer represents the density matrix corresponding to time interval "hh", and the medium layer represents the density matrix corresponding to time interval "hh+1". The path extends, over time, along time intervals hh and hh+1; the points of the first subset P1 are associated to timestamps falling in time interval hh, and points of the second subset P2 have timestamps falling in time interval hh+1. Accordingly, densities of subareas belonging to the first matrix M1 are associated to the corresponding points of the first subset P1; densities of subareas belonging to the second matrix M2 are associated to the corresponding points of the second subset P2.

Preferably, the density associated to each part, the length of such part and the time for travelling the same part are multiplied together; the result for each part is summed to the results obtained for all the other parts belonging to the same segment; the result obtained for each segment is summed to the results obtained for all the other segments belonging to the same path.

For example, the following equation can be used:

$$IUI_i = \sum_{j=1}^{NumSeg_i} \sum_{h=1}^{Hopmax_{i,j}-1} \frac{d_{i,j,h} + d_{i,j,h+1}}{2} \cdot l_{i,j,h} \cdot \Delta T_{i,j,h}$$

wherein:

$IUI_i$ is the interaction indicator for the generic i-th path;

$d_{i,j,h}$ is the density of population of the subarea in which the h-th point of the j-th segment of the i-th path falls;

$l_{i,j,h}$ is the length of the h-th part of the j-th segment of the i-th path;

$\Delta T_{i,j,h}$ is the time needed to travel the h-th part of the j-th segment of the i-th path;

$Hopmax_{i,j}$ is the number of points comprised in the j-th segment of the i-th path;

$NumSeg_i$ is the number of segments included in the i-th path.

Considering that $$\Delta T_{i,j,h} = \frac{l_{i,j,h}}{V_{i,j,h}},$$

wherein $V_{i,j,h}$ is the speed at which the h-th part of the j-th segment of the i-th path has been travelled, the interaction indicator can also be expressed as follows:

$$IUI_i = \sum_{j=1}^{NumSeg_i} \sum_{h=1}^{Hopmax_{i,j}-1} \frac{(d_{i,j,h} + d_{i,j,h+1})l_{i,j,h}^2}{2V_{i,j,h}}$$

Since the density of population referred to above, in each time interval, is expressed in terms of mobile user terminals/extension of the concerned subarea, the IUI indicator is expressed in terms of mobile user terminals/speed.

Accordingly, the interaction indicator is directly proportional to the number of points of users "met" along the path. In other terms, the higher the sum of the densities of the subareas crossed by a determined path, the higher the likelihood that the user travelling that path has interacted with other individuals.

Furthermore, the interaction indicator is inversely proportional to the speed at which the parts/segments of the path are travelled. This means that the lower the travelling speed of each part/segment, the higher the time needed to travel such part/segment, and the higher the likelihood that such user interacts with other individuals along the path.

In an embodiment, each group of said classification is identified by respective mobility features.

For example, groups can be "Resident", "Tourist", "Commuter", "Explorer", "Pedestrian", "Biker", "Car driver", "Multimodal", etc.; whether a certain mobile user terminal is associated to one group or another is determined based on the indicator(s) calculated for each path.

Preferably, an Artificial Intelligence system (e.g. Machine Learning and/or Artificial Neural Network) can be used in order to classify each path, i.e. to associate each path/mobile user terminal to at least one group.

Preferably, the area of interest is divided in a plurality of subareas. Each subarea is preferably associated with a percentage of the paths associated to the various groups. Accordingly, depending on the subareas in which the paths fall, it is determined the group to which each user most likely belongs.

In an embodiment, one or more of said groups is associated with one or more means of transport. Matching between the user and one or more of the groups can be established based on the mobility features defined by the indicators calculated above: accordingly, it is possible to determine whether a user has travelled a certain portion of path by walking, by bicycle, by car, etc. In particular, it can be determined whether a user has travelled his/her path by a single means of transport ("on foot" being preferably included in the list of possible means of transport) or by two or more means of transport (e.g. one portion on foot and one portion by car).

In an embodiment, based on mobility features of the users, useful information regarding public means of transportation can be obtained.

In more details, paths of multiple mobile user terminals will follow very similar trajectories and very similar speed profiles. The detected data are clustered based on trajectories, speed, and travelling interruptions due to stops (typical for public means of transport, in order to allow user to get on or leave the means of transport); also it is noted that, at most stops, some users will depart from the others (users leaving the means of transport) whereas some users will join the others (user getting on the means of transport). Accordingly, a statistical analysis can be carried out so as to determine how/how much a certain means of transport is used, and how/how much each line of a means of transport is used. In this context, the Applicant observes that stops due to congested traffic can be distinguished from stops for allowing users to get on/leave since, when the means of transport stops for traffic reasons, the set of users remains substantially unaltered, as no one is leaving the means of transport and no new user is getting on the means of transport.

In an embodiment, each of said groups is identified with respective mobility features, compared with preset routes or maps.

In an example, optimal routes are defined on a map and the users are classified according to a possible matching between the user's paths and such optimal routes. In other terms, given a starting point and an end point, there may be two or more possible paths for moving from such starting point to such end point; an optimal route is a priori defined. The users paths will be classified based on the similarity with respect to the optimal route. A suitable metric is defined, in order to determine how close a path is to an optimal route. Users which travel paths that are identical or very similar ("high similarity") to the optimal route will be classified as "residents"; users whose paths show a medium level of similarity with respect to the optimal route will be classified as "tourists"; users whose paths show a low level of similarity with respect to the optimal route will be classified as "explorers".

In an example, based on the present invention, it is possible in particular to estimate the usage of cycle paths.

In greater detail, position of cycle paths is known a priori, and can be represented for example on a map. Trajectories of the users are firstly filtered, selecting those which are compatible with cycle paths trajectories; then a further selection is applied, so as to select those users whose travelling speed is compatible with a preset range of speed values, typical for cycle paths.

The Applicant observes that the above processing operations can be carried out by a suitable processing apparatus, such as a computer. The latter is provided with the necessary hardware/software resources in order to receive in input data, process them and provide corresponding data as output, according to what is disclosed above. For example, the processing apparatus can be part of or connected to a telecommunications network, the latter being configured to receive, from the mobile user terminals, the above-mentioned information signals—preferably, MDT signals, so as to calculate the proper indicators and provide a user classification according to the invention.

FIG. 6 schematically shows a block diagram representing a system wherein the present invention can be implemented.

System 100 comprises a Radio Access Network RAN, schematically represented by multiple base stations or eNodeBs 110.

The Radio Access Network can provide one or more technologies for mobile connectivity to user mobile terminals UE1, UE2 . . . UEn. For example, 4G and 5G technologies are referred to in FIG. 6.

Preferably system 100 also comprises a Core Network (not shown), connected to the Radio Access Network RAN.

Mobile user terminals UE1, UE2, . . . UEn are also connected to a Global Navigation Satellite System GNSS, which allows the same mobile user terminals to determine their geographical positions.

For example, in FIG. 6 three different geographical areas are represented, namely Area A, Area B and Area C.

System 100 further comprises a collection subsystem 120, connected to the Radio Access Network RAN and the Core Network to receive the information included in the information signals. Preferably, the collection subsystem 120 comprises one or more local data collectors 121, 122, 123, each configured to receive data from a respective geographical area. In the example of FIG. 6, a first local data collector 121 collects data from Area A (see arrow MDT(A)), a second local data collector 122 collects data from Area B (see arrow MDT(B)) and a third local data collector 123 collects data from Area C (see arrow MDT(C)).

Preferably, collection subsystem 120 further comprises a centralized data collector 124, which is connected to the local data collectors 121, 122, 123, for example via an IP network 125.

Preferably, collection subsystem 120 further comprises a first storage unit 126, coupled to the centralized data collector 124, wherein data included in the information signals are stored, in particular in the form of MDT datasets.

System 100 further comprises a path reconstruction subsystem 130 which, based on the data provided by the information signals, calculates the path(s) travelled by each mobile user terminal. Path reconstruction subsystem preferably comprises a processing apparatus 131, configured to perform such calculation.

Preferably, path reconstruction subsystem 130 further comprises a second storage unit 132, coupled to the processing apparatus 131, wherein the calculated paths are stored, in particular in the form of Travelled Path Datasets.

System 100 further comprises an indicator calculation subsystem 140, preferably including one or more processing devices 141, 142 and one or more storage units 143. The indicator calculation subsystem 140 is configured to calculate one or more indicators associated with each path; as said, the indicators are indicative of morphologic and dynamic features of the respective path.

System 100 further comprises a characterization subsystem 150. Characterization subsystem 150 preferably comprises one or more processing devices 151,152 and one or more storage units 153. Characterization subsystem 150 is configured to provide a characterization of each path, based on the respective indicators, calculated by the indicator calculation subsystem 140.

Figure 7:
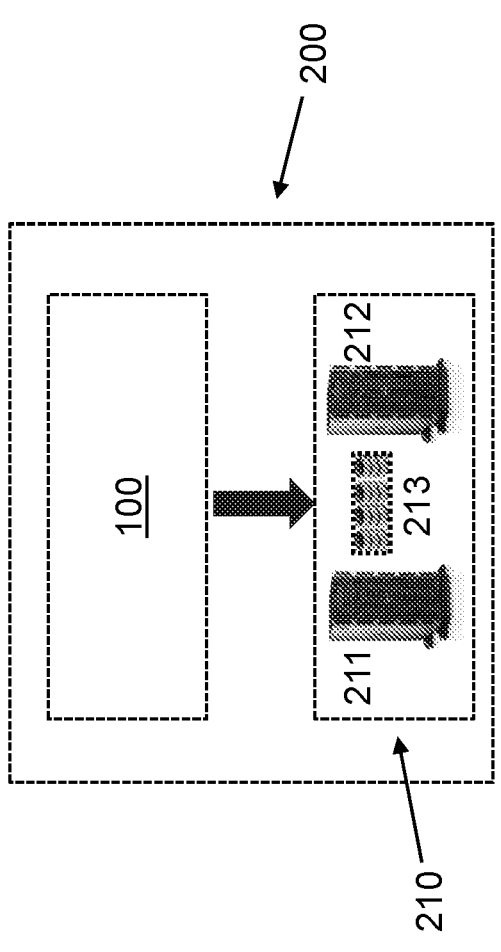

In an embodiment, the system for characterization 100 can be included in a system 200 for classification of users behaviors (FIG. 7).

In more details, system 200 comprises system 100 and a classification subsystem 210. Preferably, classification subsystem 210 includes one or more processing devices 211, 212 and one or more storage units 213. Classification subsystem 210 is configured to perform a determination operation, wherein, based on the indicators calculated by the indicator calculation subsystem 140 and/or on the characterization provided by the characterization subsystem 150, at least one group is determined, to which the mobile user terminal belongs. As said, the at least one group being one group of a set of groups of a preset classification, that is defined based on the specific use case for which the invention is employed.

The invention claimed is:

1. A method for characterization of paths travelled mobile user terminals, comprising:
   determining a geographical area of interest;
   detecting the presence of a plurality of mobile user terminals in said geographical area of interest;
   for each of said mobile user terminals:
       receiving over time a plurality of information signals, each information signal including: a geographical position of said mobile user terminal, a time reference associated with said geographical position and at least one of a temporary identifier assigned by a wireless network upon connection to said mobile user terminal upon connection thereto and a session identifier corresponding to a subscription of said mobile user terminal;
       based on said information signals, determining a path travelled by said mobile user terminal;
       calculating one or more indicators associated with said path, said one or more indicators being indicative of morphologic and dynamic features of said path; and
       providing a characterization of said paths, based on said one or more indicators.

2. The method according to claim 1, wherein said temporary identifier is a Temporary Mobile Subscriber Identity (TMSI).

3. A method according to claim 1, wherein said information signals are sent from said mobile user terminals according to the Minimization of Drive Test (MDT) technology.

4. The method according to claim 1, wherein determining said path comprises:
   based on said information signals, identifying at least a subset of a plurality of geographical positions of said mobile user terminal; and
   correlating said geographical positions in said at least one subset with each other.

5. The method according to claim 4, wherein said path comprises different segments, each segment being defined by a plurality of geographical positions, each associated with a respective time reference, wherein said geographical positions are ordered based on the respective time references, wherein a difference between time references of each couple of consecutive geographical positions is smaller than a preset threshold.

6. The method according to claim 5, wherein said path comprises joining portions joining consecutive segments.

7. The method according to claim 1, wherein the information signals including geographical positions belonging to the path are associated to the same session identifier.

8. The method according to claim 1, wherein said one or more indicators comprise a dispersion indicator, correlated to a measure of a dispersion of the points forming said path around a center of mass of said path.

9. The method according to claim 8, wherein said one or more indicators comprise a morphology indicator, correlated to a comparison between the dispersion indicator and a length of said path.

10. The method according to claim 1, wherein said one or more indicators comprise a dynamic indicator, correlated to a ratio between a length of the path or a length of a path's segment and a time needed to travel said path or segment.

11. The method according to claim 1, wherein said one or more indicators comprise an interaction indicator for at least one path, wherein calculating said interaction indicator comprises:
   dividing said geographical area in multiple subareas;
   determining, based on said information signals, a density of population, over time, for each of said subareas, said density being indicative of the number of mobile user terminals in each of said subareas, in each of a plurality of time intervals;
   dividing each segment in a plurality of parts, each part being defined as portion of segment comprised between two consecutive points;
   for each part of each segment of said path, determining: a density of population associated to said part, a length of said part, and a time needed to travel said part; and
   calculating the interaction indicator for said path, based on the density of population, length and time associated to each part of each segment included in said path.

12. A method for classification of users behaviors, comprising:
   a characterization method according to claim 1; and
   a determination operation, wherein, based on said one or more indicators and/or on said characterization, at least one group is determined, to which said mobile user terminal belongs, said at least one group being one group of a set of groups of a preset classification.

13. The method according to claim 12, wherein each group of said classification is identified by at least one of: respective mobility features respective mobility features compared with preset routes, and respective mobility features with respect to means of transport.

14. A system for characterization of paths travelled by mobile user terminals, comprising:
   a collection subsystem, configured to receive, from a Radio Access Network (RAN), information included in information signals transmitted by user mobile terminals, wherein each information signal includes: a geographical position of the mobile user terminal, a time reference associated with said geographical position and at least one of a temporary identifier assigned by a wireless network upon connection to the mobile user terminal upon connection thereto and a session identifier corresponding to a subscription of the mobile user terminal;
   a path reconstruction subsystem configured to calculate, based on the information included in the information signals, a path travelled by the mobile user terminal;
   an indicator calculation subsystem, configured to calculate one or more indicators associated with said path, said one or more indicators being indicative of morphologic and dynamic features of the path; and
   a characterization subsystem, configured to provide a characterization of the path, based on the respective indicators, calculated by the indicator calculation subsystem.

15. A system for classification of users behaviors, comprising:

a system for characterization according to claim 14; and a classification subsystem, configured to perform a determination operation, wherein, based on the indicators 5 calculated by the indicator calculation subsystem or on the characterization provided by the characterization subsystem, at least one group is determined, to which the mobile user terminal belongs, wherein the at least one group is one group of a set of groups of a preset 10 classification.

\* \* \* \* \*